United States Patent
Tabarovsky

(10) Patent No.: US 6,906,521 B2
(45) Date of Patent: Jun. 14, 2005

(54) MULTI-FREQUENCY FOCUSING FOR MWD RESISTIVITY TOOLS

(75) Inventor: Leonty Tabarovsky, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/295,969

(22) Filed: Nov. 15, 2002

(65) Prior Publication Data

US 2004/0098201 A1 May 20, 2004

(51) Int. Cl.⁷ ................................................. G01V 1/40
(52) U.S. Cl. ........................................... 324/334; 702/7
(58) Field of Search ...................... 702/7, 14; 324/339, 324/303; 703/10; 323/334

(56) References Cited

U.S. PATENT DOCUMENTS

| | | | | |
|---|---|---|---|---|
| 5,452,761 A | | 9/1995 | Beard et al. ................. 166/250 |
| 5,666,057 A | * | 9/1997 | Beard et al. ................. 324/339 |
| 5,703,773 A | * | 12/1997 | Tabarovsky ................... 702/7 |
| 5,884,227 A | | 3/1999 | Rabinovich et al. ........... 702/7 |
| 6,219,619 B1 | * | 4/2001 | Xiao et al. ..................... 702/7 |
| 6,308,136 B1 | * | 10/2001 | Tabarovsky et al. ........... 702/7 |
| 6,400,148 B1 | * | 6/2002 | Meyer et al. ............... 324/303 |
| 6,466,872 B1 | * | 10/2002 | Kriegshauser et al. ......... 702/7 |
| 6,553,314 B2 | * | 4/2003 | Kriegshauser et al. ......... 702/7 |
| 6,574,562 B2 | * | 6/2003 | Tabarovsky ................... 702/7 |
| 2002/0173913 A1 | * | 11/2002 | Tabarovsky et al. ........... 702/7 |

OTHER PUBLICATIONS

L.A. Tabarovsky et al.; *Real time 2D inversion of induction logging data*, Journal of Applied Geophysics 38 (1998) pp. 251–275, 11 Figs.

* cited by examiner

Primary Examiner—John Barlow
Assistant Examiner—Victor J. Taylor
(74) Attorney, Agent, or Firm—Madan, Mossman & Sriram, P.C.

(57) ABSTRACT

An induction logging tool is used on a MWD bottom hole assembly. Due to the finite, nonzero, conductivity of the mandrel, conventional multi frequency focusing (MFF) does not work. A correction is made to the induction logging data to give measurements simulating a perfectly conducting mandrel. MFF can then be applied to the corrected data to give formation resistivities.

12 Claims, 9 Drawing Sheets

MULTI-FREQUENCY FOCUSING FOR MWD RESISTIVITY TOOLS

BACKGROUND OF THE INVENTION

1. Field of the Invention

The invention is related to the field of electromagnetic induction well logging for determining the resistivity of earth formations penetrated by wellbores. More specifically, the invention determines a most likely value of resistivity of a highly conductive earth formation using an induction tool having a finite, non-zero conductivity.

2. Description of the Related Art

Electromagnetic induction resistivity instruments can be used to determine the electrical conductivity of earth formations surrounding a wellbore. An electromagnetic induction well logging instrument is described, for example, in U.S. Pat. No. 5,452,761 issued to Beard et al. The instrument described in the Beard et al '761 patent includes a transmitter coil and a plurality of receiver coils positioned at axially spaced apart locations along the instrument housing. An alternating current is passed through the transmitter coil. Voltages which are induced in the receiver coils as a result of alternating magnetic fields induced in the earth formations are then measured. The magnitude of certain phase components of the induced receiver voltages are related to the conductivity of the media surrounding the instrument.

As is well known in the art, the magnitude of the signals induced in the receiver coils is related not only to the conductivity of the surrounding media (earth formations) but also to the frequency of the alternating current. At higher alternating current frequencies, the signals induced in the receiver coils are generally smaller than the signals which are induced at lower frequencies because of the so-called "skin effect". Worse still, the magnitude of the skin effect is also related to the conductivity itself at any particular frequency. While it would appear that merely reducing the frequency of the alternating current would reduce the skin effect in the resulting measurements, it is also known in the art that the magnitude of the induced signals in the receiver coils is proportional to the frequency of the alternating current. Using higher frequencies is desirable in order to enhance the accuracy with which the conductivity can be determined when the conductivity is small.

An advantageous feature of the instrument described in Beard '761 is that the alternating current flowing through the transmitter coil includes a plurality of different component frequencies. Having a plurality of different component frequencies in the alternating current makes possible more accurate determination of the apparent conductivity of the media surrounding the instrument by using various methods of estimating the induced signal magnitude that would be obtained in the various receiver coils if the frequency of the alternating current were zero.

One method for estimating the magnitude of signals that would be obtained at zero frequency is described, for example, in U.S. Pat. No. 5,666,057, issued to Beard et al., entitled, "Method for Skin Effect Correction and Data Quality Verification for a Multi-Frequency Induction Well Logging Instrument". The method of Beard '057 in particular, and other methods for skin effect correction in general, are designed only to determine skin effect corrected signal magnitudes, where the induction logging instrument is fixed at a single position within the earth formations. A resulting drawback to the known methods for skin effect correction of induction logs is that they do not fully account for the skin effect on the induction receiver response within earth formations including layers having high contrast in the electrical conductivity from one layer to the next. If the skin effect is not accurately determined, then the induction receiver responses cannot be properly adjusted for skin effect, and as a result, the conductivity (resistivity) of the earth formations will not be precisely determined.

U.S. Pat. No. 5,884,227, issued to Rabinovich et al., having the same assignee as the present invention, is a method of adjusting induction receiver signals for skin effect in an induction logging instrument including a plurality of spaced apart receivers and a transmitter generating alternating magnetic fields at a plurality of frequencies. The method includes the steps of extrapolating measured magnitudes of the receiver signals at the plurality of frequencies, detected in response to alternating magnetic fields induced in media surrounding the instrument, to a response which would be obtained at zero frequency. A model of conductivity distribution of the media surrounding the instrument is generated by inversion processing the extrapolated magnitudes. Rabinovich '227 works under the assumption that the induction tool device has perfect conductivity. In a measurement-while-drilling device, this assumption does not hold.

Multi-frequency focusing (MFF) is an efficient way of increasing depth of investigation for electromagnetic logging tools. It is being successfully used in wireline applications, for example, in processing and interpretation of 3DEX data. MFF is based on specific assumptions regarding behavior of electromagnetic field in frequency domain. For MWD tools mounted on metal mandrels, those assumptions are not valid. Particularly, the composition of a mathematical series describing EM field at low frequencies changes when a very conductive body is placed in the vicinity of sensors. Only if the mandrel material were perfectly conducting, would MFF be applicable. There is a need for a method of processing multi-frequency data acquired with real MWD tools having finite non-zero conductivity. The present invention satisfies this need.

SUMMARY OF THE INVENTION

The present invention is a method and apparatus for obtaining a parameter of interest of an earth formation using an induction tool conveyed within a borehole in the earth formation. The induction tool has a mandrel with a finite, non-zero conductivity. A transmitter on the induction tool induces signals in the earth formation at a plurality of frequencies. The induced currents are detected by a plurality of axially-separated receivers giving a plurality of depths of investigation. A processor corrects the obtained data for effects of the mandrel to obtain corrected data representative of an induction tool having a mandrel with infinite conductivity. The formation properties are determined from the corrected data. The correction is preferably obtained by obtaining coefficients of a Taylor series expansion of the magnetic field surrounding a mandrel having a finite non-zero conductivity in powers of $\omega^{1/2}$.

The formation properties are obtained from the corrected data by a multifrequency focusing of the type previously used in wireline logging for a mandrel of infinite conductivity.

DESCRIPTION OF PREFERRED EMBODIMENT

Figure 1:
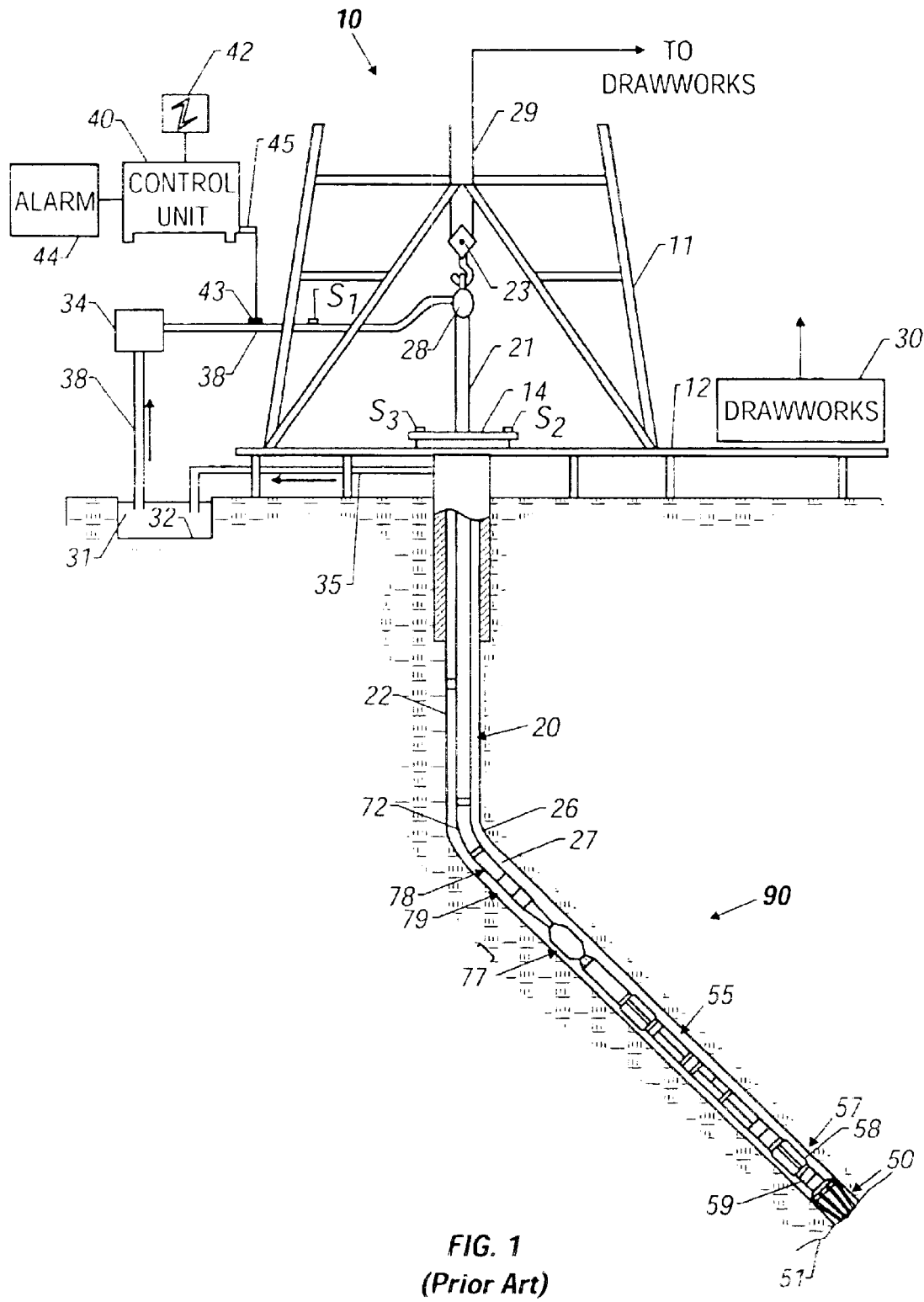
FIG. 1 (Prior Art) shows an induction logging instrument as it is typically used to make measurements for use with the method of the invention.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In the preferred embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$–$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur.

Figure 1A:
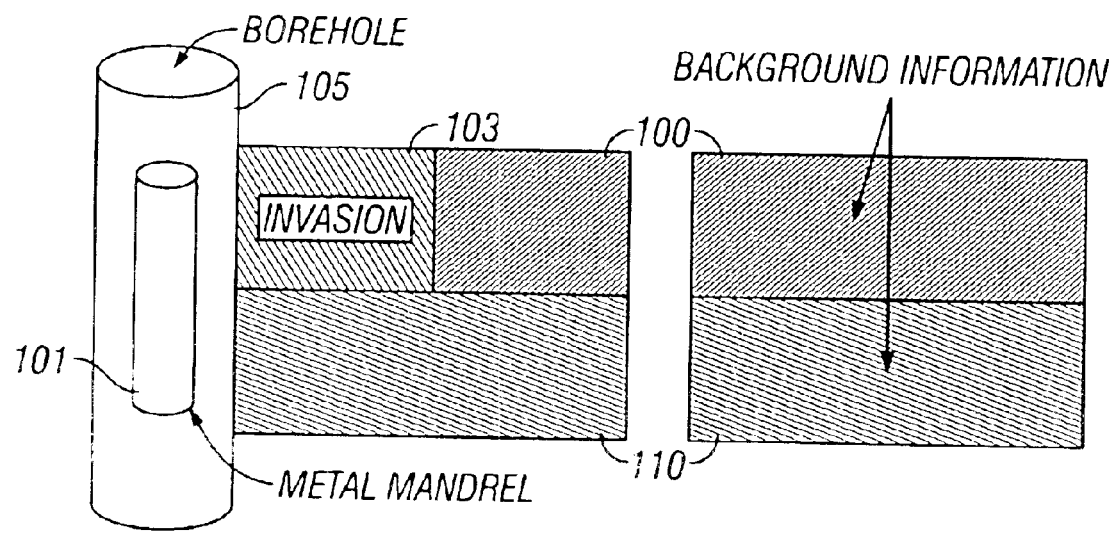
FIG. 1A shows an induction tools conveyed within a formation layer.

FIG. 1A shows a typical configuration of a metal mandrel 101 within a borehole 105. Two formation layers, an upper formation layer 100 and a lower formation layer 110, are shown adjacent to the borehole 105. A prominent invasion zone is shown in the upper formation layer.

Figure 2:
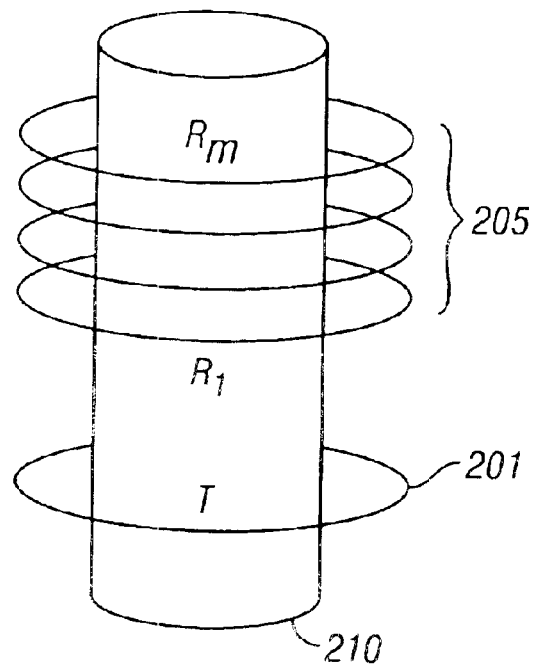
FIG. 2 shows a typical induction tool of the present invention.

FIG. 2 shows a generic tool for evaluation of MFF in MWD applications (MFFM) using the present invention. A transmitter, T, (201) is excited at a plurality of RF frequencies $f_1, \ldots, f_n$. For illustrative purposes, eight frequencies are considered: 100, 140, 200, 280, 400, 560, 800, and 1600 kHz. A plurality of axially-separated receivers, $R_1, \ldots, R_m$, (205) are positioned at distances, $L_1, \ldots, L_m$, from transmitter. For illustrative purposes, distances of the seven receivers are chosen as L=0.3, 0.5, 0.7, 0.9, 1.1, 1.3, and 1.5 m. Transmitter 201 and receivers 205 enclose a metal mandrel 210. In all examples, the mandrel radius is 8 cm, the transmitter radius is 9 cm, and the radius of the plurality of receivers is 9 cm. Data is obtained by measuring the responses of the plurality of receivers 205 to an induced current in the transmitter 201. Such measured responses can be, for example, a magnetic field response. The mandrel conductivity may be assumed perfect (perfectly conducting mandrel, PCM) or finite (finite conductivity mandrel, FCM). In the method of the present invention, obtained data is corrected for the effects of the finite conductivity mandrel, such as skin effect, for example, in order to obtain data representative of an induction tool operated in the same manner, having an infinite conductivity. Corrected data can then be processed using multi-frequency focusing. Typical results of multi-frequency focusing can be, for instance, conductivity. A calculated relationship can obtain value of conductivity, for example, when frequency is equal to zero. Any physical quantity oscillating in phase with the transmitter current is called real and any measurement shifted 90 degrees with respect to the transmitter current is called imaginary, or quadrature.

Obtaining data using a perfectly conducting mandrel is discussed in Rabinovich et al., U.S. Pat. No. 5,884,227, having the same assignee as the present invention, the contents of which are fully incorporated herein by reference. When using a perfecting conducting induction measurement device, multi-frequency focusing (MFF) can be described using a Taylor series expansion of EM field frequency. A detailed consideration for MFFW (wireline MFF applications) can be used. Transmitter (201), having a distributed current $J(x,y,z)$ excites an EM field with an electric component $E(x,y,z)$ and a magnetic component $H(x,y,z)$. Induced current is measured received by a collection of coils, such as coils 205.

An infinite conductive space has conductivity distribution $\sigma(x,y,z)$, and an auxiliary conductive space ('background conductivity') has conductivity $\sigma_0(x,y,z)$. Auxiliary electric dipoles located in the auxiliary space can be introduced. For the field components, of these dipoles, the notation $e^n(P_0,P)$, $h^n(P_0,P)$, where n stands for the dipole orientation, P and $P_0$, indicate the dipole location and the field measuring point, respectively. The electric field $E(x,y,z)$ satisfies the following integral equation (see L. Tabarovsky, M. Rabinovich, 1998, Real time 2-D inversion of induction logging data. Journal of Applied Geophysics, 38, 251–275.):

$$E(P_0) = E^0(P_0) + \int_{-\infty}^{+\infty}\int_{-\infty}^{+\infty}\int_{-\infty}^{+\infty} (\sigma - \sigma_0)\hat{e}(P_0 \mid P)E(P)\,dx\,dy\,dz. \quad (1)$$

where $E^0(P_0)$ is the field of the primary source J in the background medium $\sigma_0$. The 3×3 matrix $e(P_0|P)$ represents the electric field components of three auxiliary dipoles located in the integration point P.

The electric field, E, may be expanded in the following Taylor series with respect to the frequency $\omega$.

$$E = \sum_{k=2}^{k=\infty} u_{\frac{k}{2}} (-i\omega)^{\frac{k}{2}} \quad (2)$$

$$u_{\frac{3}{2}} = 0$$

The coefficient $u_{5/2}$ corresponding to the term $\omega^{5/2}$ is independent of the properties of a near borehole zone, thus $$u_{\frac{5}{2}} = u_{\frac{5}{2}}^0.$$

This term is sensitive only to the conductivity distribution in the undisturbed formation (100) shown in FIG. 1A.

The magnetic field can be expanded in a Taylor series similar to Equation (2):

$$H = \sum_{k=0}^{k=\infty} s_{\frac{k}{2}} (-i\omega)^{\frac{k}{2}} \quad (3)$$

$$s_{\frac{1}{2}} = 0$$

In the term containing $\omega^{3/2}$, the coefficient $s_{3/2}$ depends only on the properties of the background formation, in other words $s_{3/2} = s_{3/2}^0$. This fact is used in multi-frequency processing. The purpose of the multi-frequency processing is to derive the coefficient $u_{5/2}$ if the electric field is measured, and coefficient $s_{3/2}$ if the magnetic field is measured. Both coefficients reflect properties of the deep formation areas.

If an induction tool consisting of dipole transmitters and dipole receivers generates the magnetic field at m angular frequencies, $\omega_1, \omega_2, \ldots, \omega_m$, the frequency Taylor series for the imaginary part of magnetic field has the following form:

$$\text{Im}(H) = \sum_{k=1}^{k=\infty} s_{\frac{k}{2}} \omega^{\frac{k}{2}} \quad (4)$$

$$s_{2j} = 0; \quad j = 1, 2, \ldots,.$$

where $s_{k/2}$ are coefficients depending on the conductivity distribution and the tool's geometric configuration, not on the frequency. Rewriting the Taylor series for each measured frequency obtains:

$$\begin{pmatrix} H(\omega_1) \\ H(\omega_2) \\ \vdots \\ H(\omega_{m-1}) \\ H(\omega_m) \end{pmatrix} = \begin{pmatrix} \omega & \omega_1^{\frac{3}{2}} & \omega_1^{\frac{5}{2}} & \cdots & \omega_1^{\frac{n}{2}} \\ \omega & \omega_2^{\frac{3}{2}} & \omega_2^{\frac{5}{2}} & \cdots & \omega_2^{\frac{n}{2}} \\ \vdots & \vdots & \vdots & \vdots & \vdots \\ \omega & \omega_{m-1}^{\frac{3}{2}} & \omega_{m-1}^{\frac{5}{2}} & \cdots & \omega_{m-1}^{\frac{n}{2}} \\ \omega & \omega_m^{\frac{3}{2}} & \omega_m^{\frac{5}{2}} & \cdots & \omega_m^{\frac{n}{2}} \end{pmatrix} \begin{pmatrix} s_1 \\ s_{\frac{3}{2}} \\ s_{\frac{5}{2}} \\ \vdots \\ s_{\frac{n}{2}} \end{pmatrix}. \quad (5)$$

Solving the system of Equations (5), it is possible to obtain the coefficient $s_{3/2}$.

Figure 3:
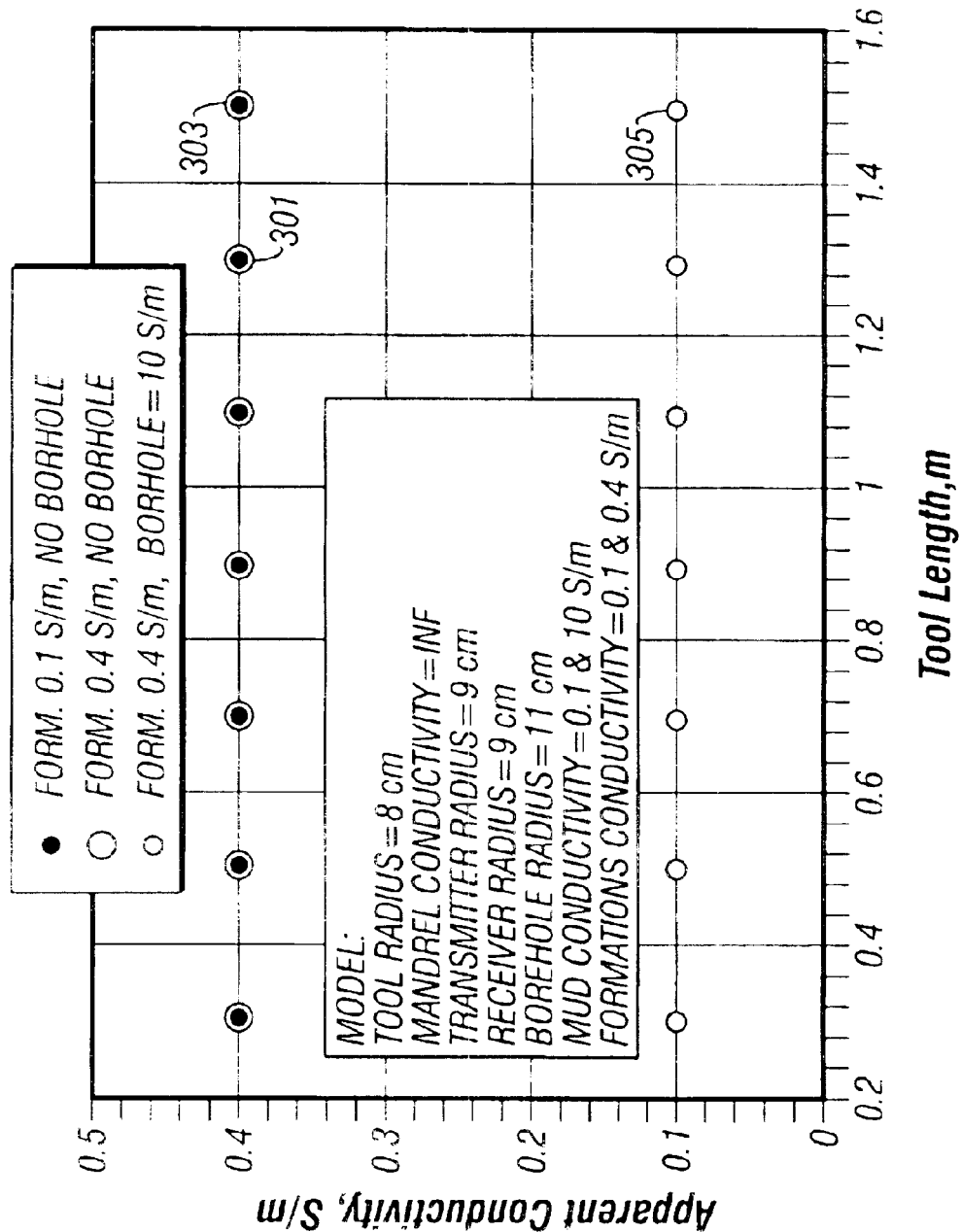
FIG. 3 shows responses of a induction tool with a perfectly conducting mandrel.

FIG. 3 shows the results of MFF for a perfectly conducting mandrel. In FIG. 3, borehole radius is 11 cm. MFF, as performed based on Eq. (5) and Eq. (3) (MFFW) produces the expected results. Data sets 301 and 305 are shown for a formation having 0.4 S/m and 0.1 S/m respectively, with no borehole effects. Data set 303 is shown for a formation having 0.4 S/m and a borehole having mud conductivity 10

S/m and 0.1 S/m. Apparent conductivity data, processed using MFFW, do not depend on borehole parameters or tool length. Specifically, apparent conductivity equals to the true formation conductivity. The present invention can be used to correct from an FCM tool to a PCM with the same sensor arrangements.

Fundamental assumptions enabling implementing are based on the structure of the Taylor series, Eq. (2) and Eq. (3). These assumptions are not valid if a highly conductive body is present vicinity of sensors (e.g., mandrel of MWD tools). The present invention uses an asymptotic theory that enables building MFF for MWD applications (MFFM).

The measurements from a finite conductivity mandrel can be corrected to a mandrel having perfect conductivity. Deriving a special type of integral equations for MWD tools enables this correction. The magnetic field measured in a typical MWD electromagnetic tool may be described by $$H_\alpha(P) = H_\alpha^0(P) + \beta \int_S \{\vec{H}^{M\alpha} \vec{h}\} dS \qquad (6)$$

where $H_\alpha(P)$ is the magnetic field measure along the direction $\alpha$ ($\alpha$-component), P is the point of measurement, $H_\alpha^0(P)$ is the $\alpha$-component of the measured magnetic field given a perfectly conducting mandrel, S is the surface of the tool mandrel, $\beta = 1/\sqrt{-i\omega\mu\sigma^r}$, where $\omega$ and $\mu$ are frequency and magnetic permeability, and $^{m\alpha}h$ is the magnetic field of an auxiliary magnetic dipole in a formation where the mandrel of a finite conductivity is replaced by an identical body with a perfect conductivity. The dipole is oriented along $\alpha$-direction. At high conductivity, $\beta$ is small.

Equation (6) is evaluated using a perturbation method, leading to the following results:

$$H_\alpha = \sum_{i=0}^{i=\infty} {}^{(i)}H_\alpha \qquad (7)$$

$$^{(0)}H_\alpha = H_\alpha^0 \qquad (8)$$

$$^{(i)}H_\alpha = \beta \int_S \{{}^{(i-1)}\vec{H}_0^{M\alpha} \vec{h}\} dS \qquad (9)$$

$$i = 1, \ldots, \infty$$

In a first order approximation that is proportional to the parameter $\beta$:

$$^{(1)}H_\alpha = \beta \int_S \{{}^{(0)}\vec{H}^{M\alpha} \vec{h}\} dS = \beta \int_S \{\vec{H}_0^{M\alpha} \vec{h}\} dS \qquad (10)$$

The integrand in Eq. (10) is independent of mandrel conductivity. Therefore, the integral on the right-hand side of Eq. (10) can be expanded in wireline-like Taylor series with respect to the frequency, as:

$$\int_S \{\vec{H}_0^{M\alpha} \vec{h}\} dS \approx \qquad (11)$$

$$b_0 + (-i\omega\mu)b_1 + (-i\omega\mu)^{\frac{3}{2}} b_{\frac{3}{2}} + (-i\omega\mu)^2 b_2 + \ldots$$

Substituting Eq. (11) into Eq. (10) yields:

$$^{(1)}H_\alpha = \qquad (12)$$

$$\frac{1}{\sqrt{\sigma_c}} \left( \frac{b_0}{(-i\omega\mu)^{\frac{1}{2}}} + (-i\omega\mu)^{\frac{1}{2}} b_1 + (-i\omega\mu) b_{\frac{3}{2}} + (-i\omega\mu)^{\frac{3}{2}} b_2 + \ldots \right)$$

Further substitution in Eqs. (7), (8), and (9) yield:

$$H_\alpha \approx \qquad (13)$$

$$H_\alpha^0 + \frac{1}{\sqrt{\sigma_c}} \left( \frac{b_0}{(-i\omega\mu)^{\frac{1}{2}}} + (-i\omega\mu)^{\frac{1}{2}} b_1 + (-i\omega\mu) b_{\frac{3}{2}} + (-i\omega\mu)^{\frac{3}{2}} b_2 + \ldots \right)$$

Considering measurement of imaginary component of the magnetic field, Equation (5), modified for MWD applications has the following form:

$$\begin{pmatrix} H(\omega_1) \\ H(\omega_2) \\ \vdots \\ H(\omega_{m-1}) \\ H(\omega_m) \end{pmatrix} = \begin{pmatrix} \omega_1^{\frac{1}{2}} & \omega_1^1 & \omega_1^{\frac{3}{2}} & \omega_1^{\frac{5}{2}} & \cdots & \omega_1^{\frac{n}{2}} \\ \omega_2^{\frac{1}{2}} & \omega_2^1 & \omega_2^{\frac{3}{2}} & \omega_2^{\frac{5}{2}} & \cdots & \omega_2^{\frac{n}{2}} \\ \vdots & \vdots & \vdots & \vdots & \vdots & \vdots \\ \omega_{m-1}^{\frac{1}{2}} & \omega_{m-1}^1 & \omega_{m-1}^{\frac{3}{2}} & \omega_{m-1}^{\frac{5}{2}} & \cdots & \omega_{m-1}^{\frac{n}{2}} \\ \omega_m^{\frac{1}{2}} & \omega_m^1 & \omega_m^{\frac{3}{2}} & \omega_m^{\frac{5}{2}} & \cdots & \omega_m^{\frac{n}{2}} \end{pmatrix} \begin{pmatrix} s_{\frac{1}{2}} \\ s_1 \\ s_{\frac{3}{2}} \\ s_{\frac{5}{2}} \\ \vdots \\ s_{\frac{n}{2}} \end{pmatrix} \qquad (14)$$

Details are given in the Appendix. The residual signal (third term) depends on the mandrel conductivity, but this dependence is negligible due to very large conductivity of the mandrel. Similar approaches may be considered for the voltage measurements.

In Eq. (13), the term $H_\alpha^0$ describes effect of PCM, and the second term containing parentheses describes the effect of finite conductivity. At relatively low frequencies, the main effect of finite conductivity is inversely proportional to $\omega^{1/2}$ and $$\sigma^{\frac{1}{2}}: \qquad (15)$$

$$H_\alpha \approx H_\alpha^0 + \frac{1}{\sqrt{\sigma_c}} \left( \frac{b_0}{(-i\omega\mu)^{\frac{1}{2}}} \right)$$

Figure 4:
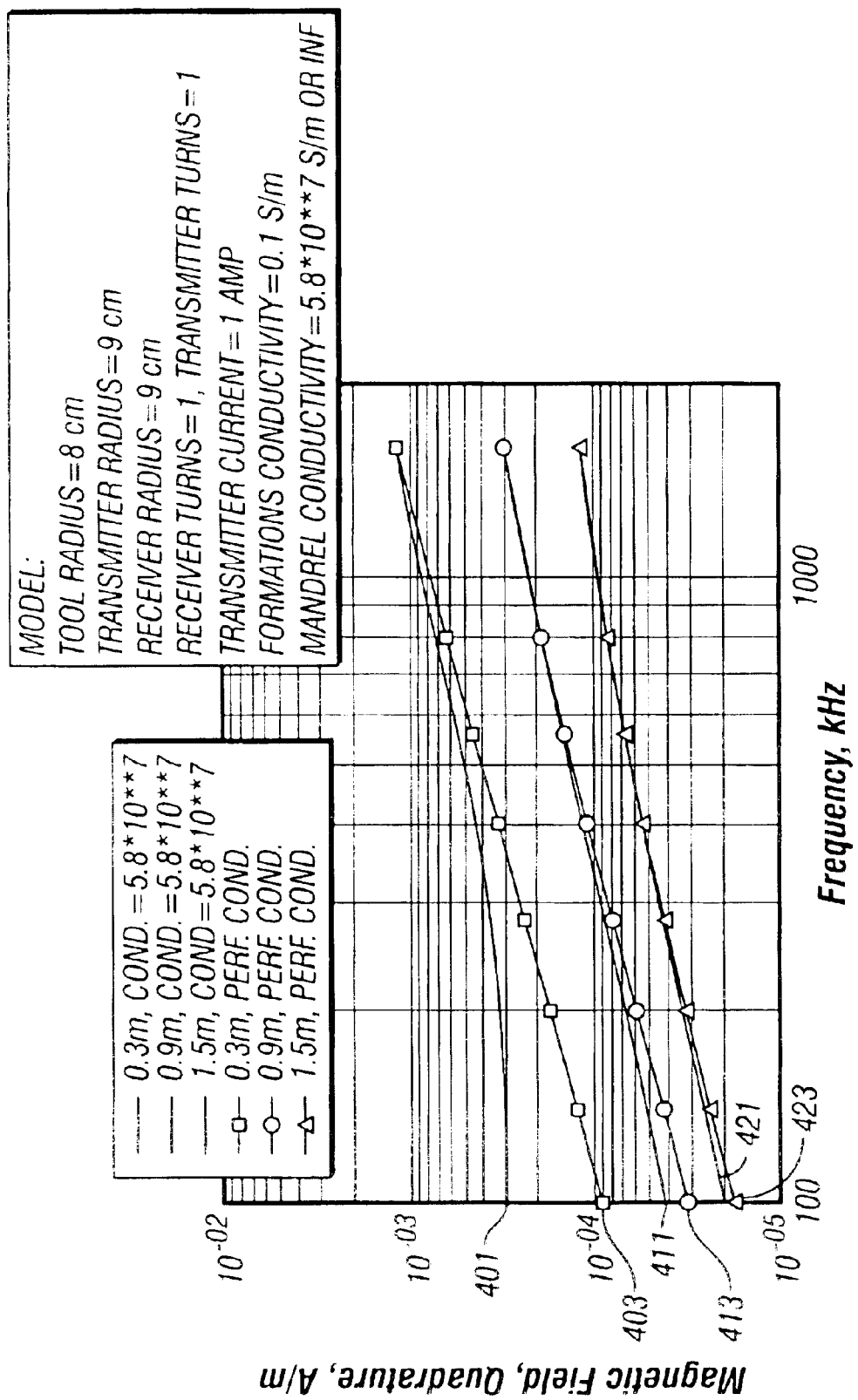
FIG. 4 shows the effect of finite mandrel conductivity.
Figure 5:
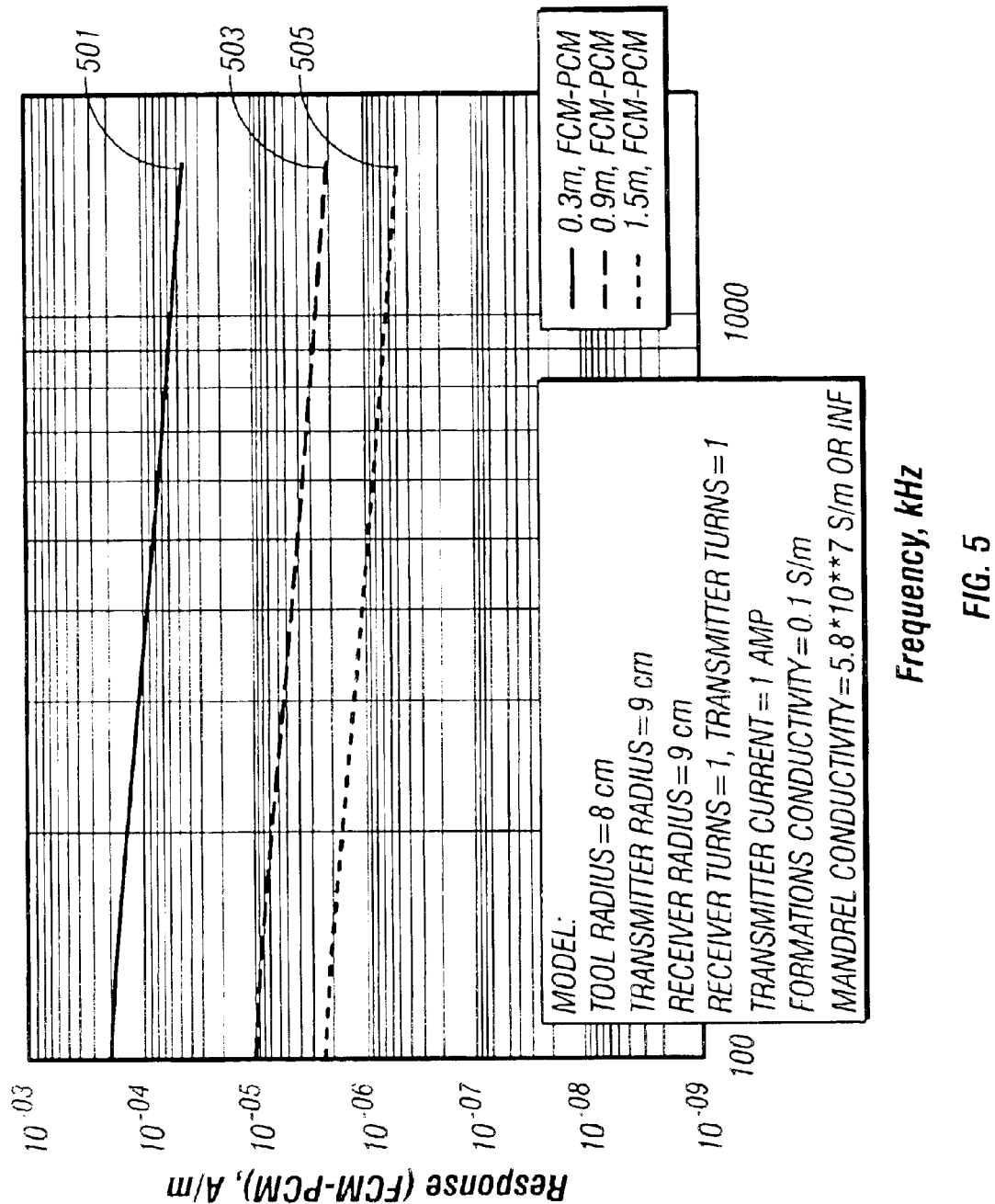
FIG. 5 shows the difference between finite conducting mandrel and perfect conducting mandrel at several frequencies.

FIGS. 4 and 5 confirm the validity of Equation (15). Values shown in FIG. 4 are calculated responses of PCM and FCM tools in a uniform formation with conductivity of 0.1 S/m with a transmitter current of 1 Amp. FIG. 4 shows three pairs of data curves: 401 and 403; 411 and 413; and 421 and 423. Within each pairing, the differences of the individual curves are due only to the conductivity of the mandrel. Curves 401 and 403 are measured using a receiver separated from the transmitter by 0.3 m. Curve 401 is measured with a mandrel having $5.8*10^7$ S/m and Curve 403 assumes perfect conductivity. Similarly, curves 411 and 413 are measured using receiver separated from the transmitter by 0.9 m. Curve 411 is measured with a mandrel having $5.8*10^7$ S/m and Curve 413 assumes perfect conductivity. Lastly, curves 421 and 423 are measured using receiver separated from the transmitter by 1.5 m. Curve 421 is measured with a mandrel having $5.8*10^7$ S/m and Curve 423 assumes perfect conductivity. Curves 401, 411, 421, indicative of the curves for FCM diverge from curves 403, 413, and 423, respectively, in the manner shown in Eq. (15), (i.e., $1/\omega^{1/2}$ divergence).

FIG. 5 shows that, as a function of frequency, the difference of FCM and PCM responses follows the rule of $1/\omega^{1/2}$ with a very high accuracy. The scale value represents the difference in values between responses obtained for PCM and FCM (PCM-FCM in A/m) at several frequencies. Actual formation conductivity is 0.1 S/m. Curve 501 demonstrates this difference for a receiver-transmitter spacing of 0.3 m. Curves 503 and 505 demonstrate this difference for receiver transmitter spacing of 0.9 m and 1.5 m, respectively.

Figure 6:
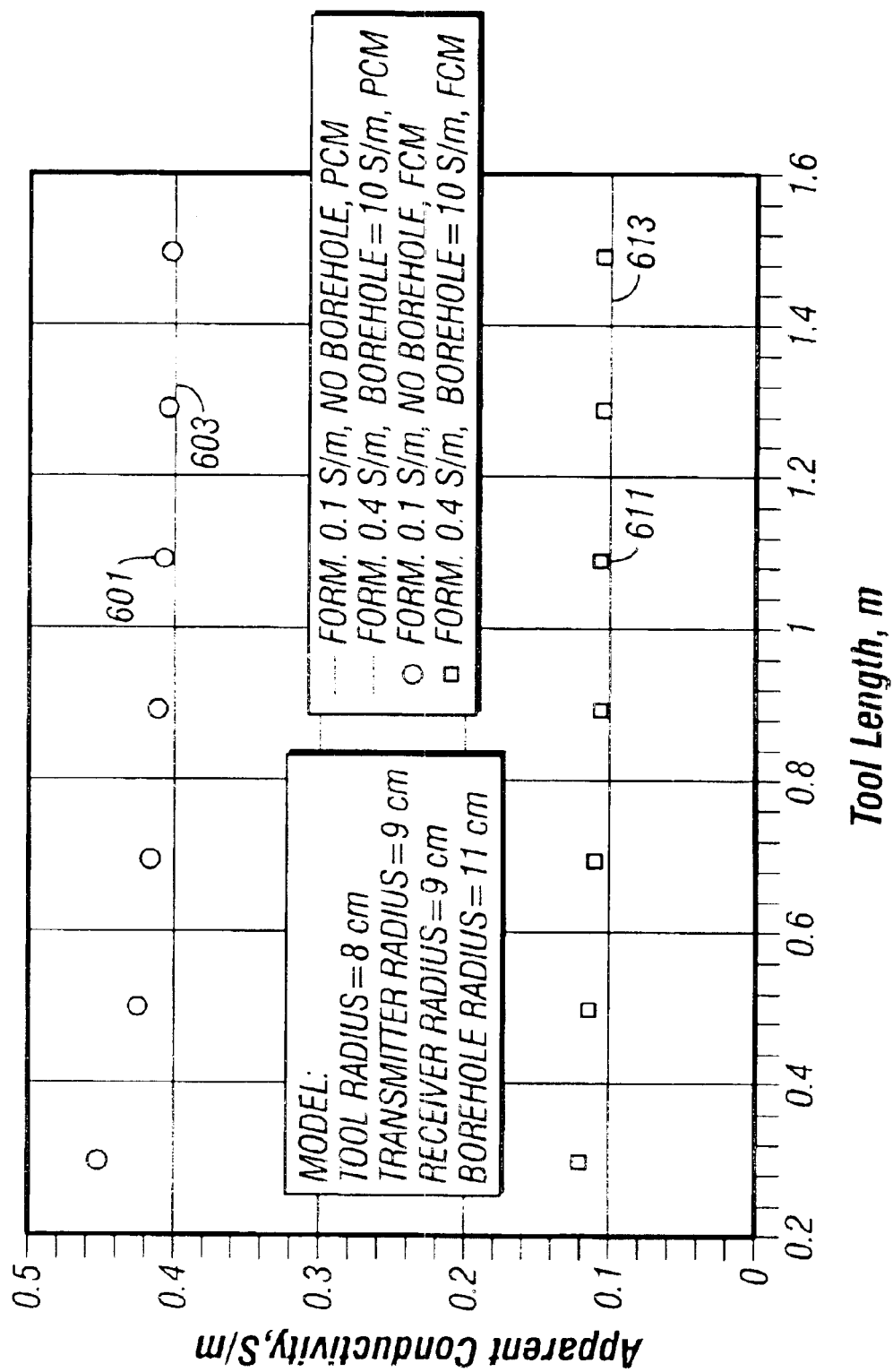
FIG. 6 shows the effect of wireline multi-frequency focusing processing of data acquired with perfectly conducting mandrel and finite conducting mandrel.

FIG. 6 shows the inability of prior methods of MFFW to correct data acquired from FCM to that of PCM. The results are from conductivity measurements in a uniform space with conductivity of 0.1 S/m and in a space with conductivity 0.4 S/m containing a borehole. The borehole has a radius of 11 cm and a conductivity of 10 S/m. In both models, PCM and FCM responses are calculated and shown. In the FCM case, the mandrel conductivity is $2.8 \ast 10^7$ S/m. As mentioned previously, MFFW is applicable to PCM tools. FIG. 6 shows the results of PCM (603 and 613) do not depend on tool spacing and borehole parameters. Obtained values for apparent conductivity are very close to the real formation conductivity. However, for an FCM tool, such as 601 and 611, there is a dependence of MFFW on borehole parameters and tool length. The present invention addresses two of the major effects: the residual influence of the imperfect mandrel conductivity, and borehole effects.

Figure 7:
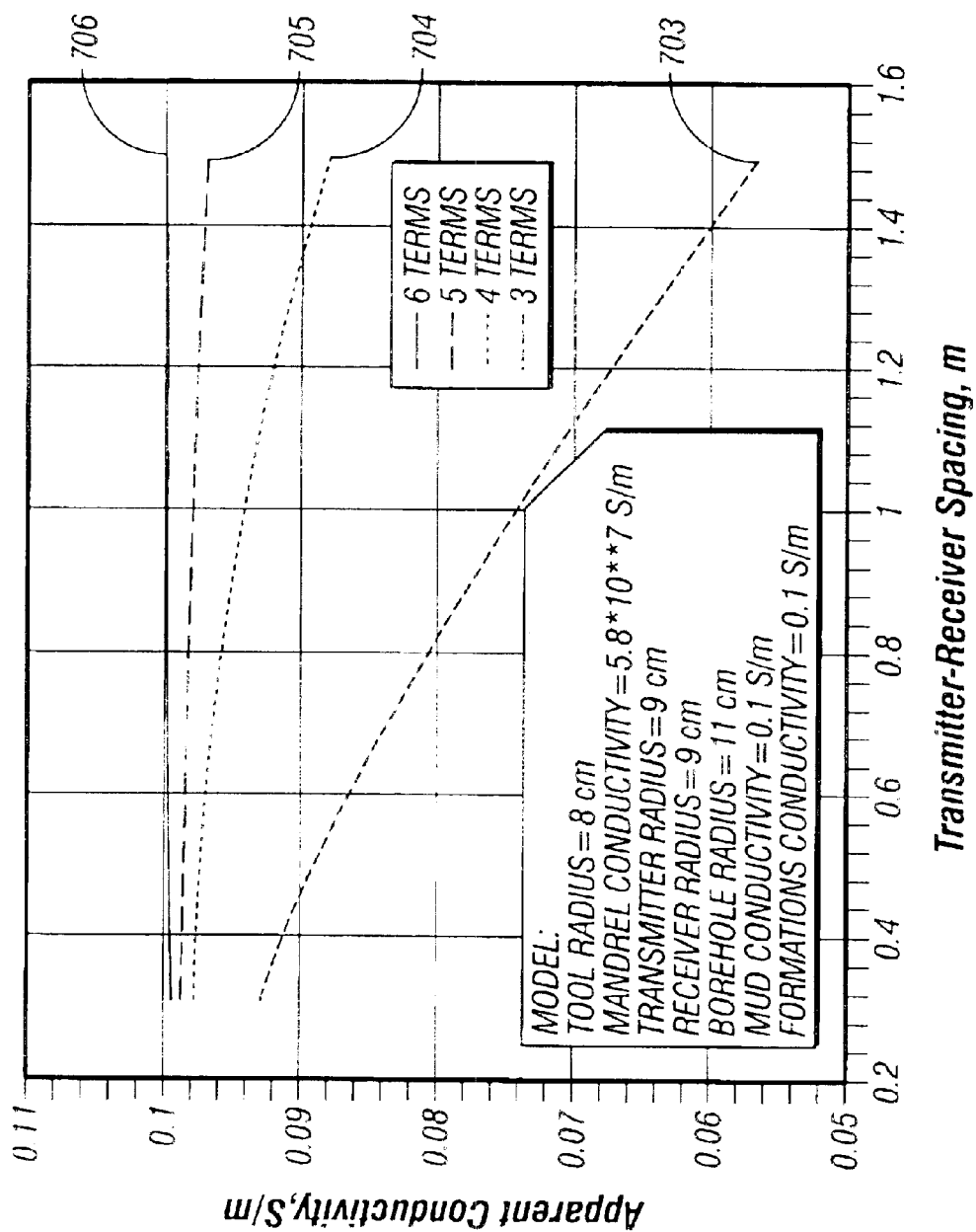
FIG. 7 shows the convergence of the method of the present invention with the increased number of expansion terms.

FIG. 7 illustrates convergence of the method of the present invention as the number of terms in the expansion of Eq. (13) increases. Eight frequencies are used for the MFFM processing: 100, 140, 200, 280, 400, 460, 800, and 1600 kHz. Curve 703 shows results with an expansion having 3 terms. Curve 703 shows a large deviation from true conductivity at long tool length. Curves 704, 705, and 706 show results with an expansion having 4, 5, and 6 terms, respectively. About 5 or 6 terms of the Taylor series are required for an accurate correction to true conductivity of 01 S/m. FIG. 7 also illustrates the ability of convergence regardless of tool length. Significantly, the factor k (equal to 15594 S/(Amp/m$^2$)) for transforming magnetic field to conductivity is independent of spacing.

Figure 8:
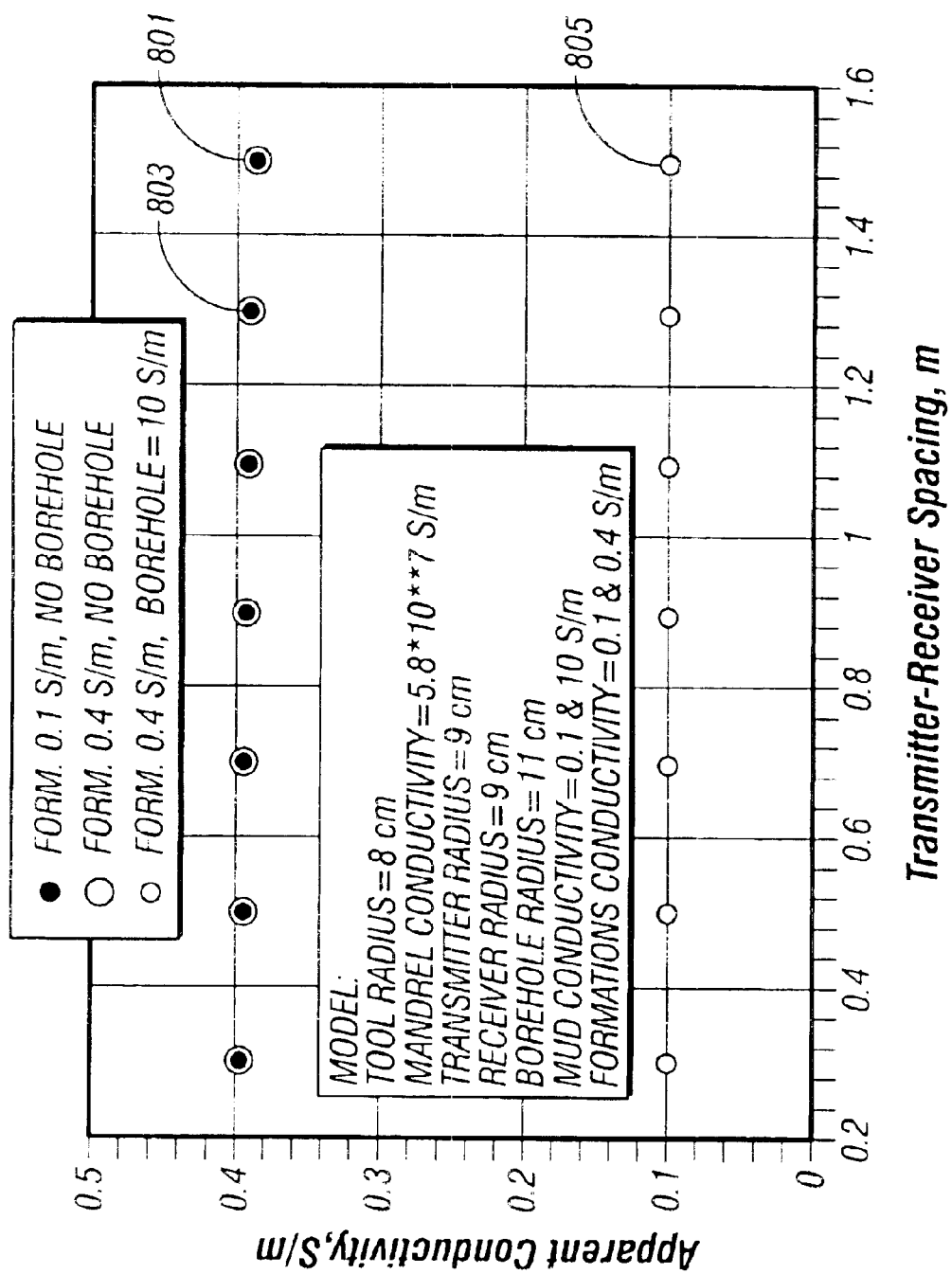
FIG. 8 shows multi-frequency focusing of the finite conducting mandrel response.

FIG. 8 presents the results of the method of the present invention in formations with and without borehole. Data points 801 and 805 show data received from formation having 0.4 S/m and 0.1 S/m respectively, with no borehole effects. Data points 803 shows data received from formation having conductivity 0.4 S/m with a borehole having 10 S/m. FIG. 8 shows that the effect of the borehole is completely eliminated by the method of the present invention. FIG. 8 also shows that after applying the method of the present invention, the value of the response data is independent of the spacing of the receivers. This second conclusion enables a tool design for deep-looking MWD tools using short spacing, further enabling obtaining data from the background formation (100 and 110 in FIG. 1A) and reducing difficulties inherent in data obtained from an invasion zone (103 in FIG. 1A). In addition, focused data are not affected by the near borehole environment. Results of FIG. 8 can be compared to FIG. 3.

Figure 9:
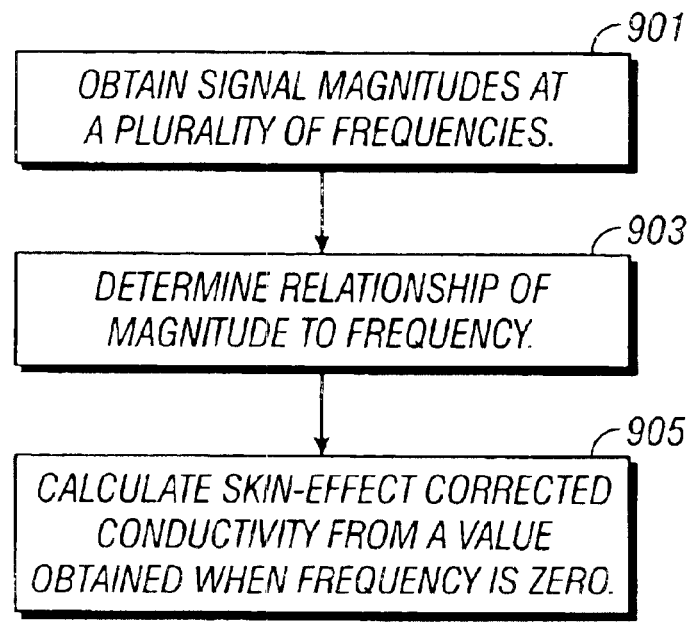
FIG. 9 shows a flowchart of the method of correcting a conductivity for a skin effect.

FIG. 9 shows a flowchart indicative of a method of the present invention. In Box 901, an operator measures signal magnitudes obtained at a plurality of transmitter frequencies. In Box 903, a relationship is then determined between the obtained signal magnitudes of the response and the frequency. In Box 905, the skin-effect corrected conductivity is calculated by obtaining a value that coincidences with a reduction of the frequency to zero.

Figure 10:
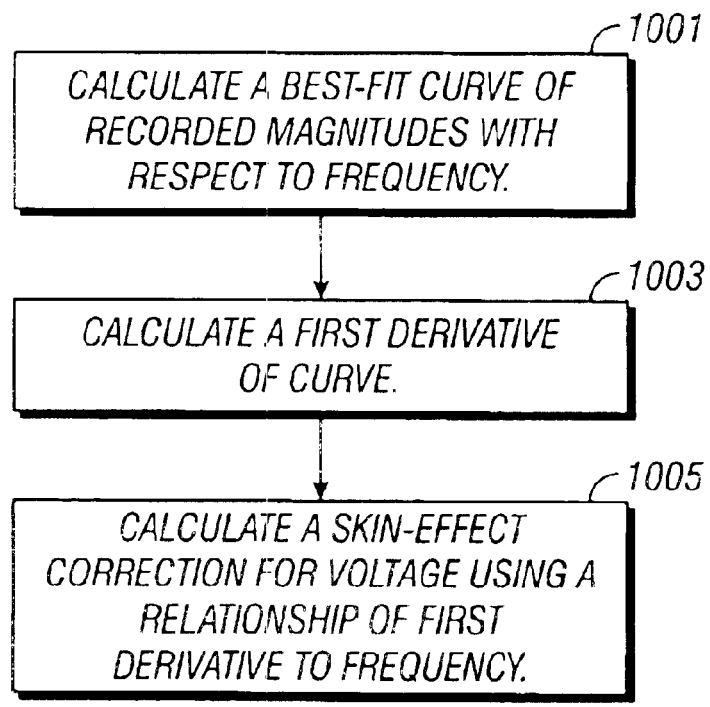
FIG. 10 shows a flowchart for obtaining the skin-effect correction.

FIG. 10 shows a flowchart for determining a relationship between signal magnitude and frequency. In Box 1001, a best-fit curve of recorded signal magnitudes are plotted against frequencies. A first derivative of the curve of Box 1001 is calculated in Box 1003. In Box 1005, the calculated first derivative of Box 1003 is used to calculate a skin-effect correction for voltage by using a relationship of first derivative to frequency.

While the foregoing disclosure is directed to the preferred embodiments of the invention, various modifications will be apparent to those skilled in the art. It is intended that all such variations within the scope and spirit of the appended claims be embraced by the foregoing disclosure.

Appendix: Taylor's Frequency Series for MWD Electromagnetic Tool

We intend to evaluate the asymptotic behavior of magnetic field on the surface of a metal mandrel as described in Eq. (6):

$$H_\alpha(P) = H_\alpha^0(P) + \beta \int_S \{\vec{H}_0^{M\alpha} \vec{h}\} dS \qquad (A3.1)$$

The primary and auxiliary magnetic fields, $H_\alpha^0$ and $^{M\alpha}\vec{h}$, depend only on formation parameters. The total magnetic filed, $H_\alpha$, depends on both formation parameters and mandrel conductivity. The dependence on mandrel conductivity, $\sigma_c$, is reflected only in parameter $\beta$:

$$\beta = \frac{1}{k_c} = \frac{1}{\sqrt{-i\omega\mu\sigma_c}} \qquad (A3.2)$$

The perturbation method applied to Eq. (A3.1) leads to the following result:

$$H_\alpha = \sum_{i=0}^{i=\infty} {}^{(i)}H_\alpha \qquad (A3.3)$$

$$^{(0)}H_\alpha = H_\alpha^0 \qquad (A3.4)$$

$$^{(i)}H_\alpha = \beta \int_S \{^{(i-1)}\vec{H}_0^{M\alpha} \vec{h}\} dS \qquad (A3.5)$$

$$i = 1, \ldots, \infty$$

Let us consider the first order approximation that is proportional to the parameter $\beta$:

$$^{(1)}H_\alpha = \beta \int_S \{^{(0)}\vec{H}_0^{M\alpha} \vec{h}\} dS = \beta \int_S \{\vec{H}_0^{M\alpha} \vec{h}\} dS \qquad (A3.6)$$

The integrand in Eq. (A3.6) does not depend on mandrel conductivity. Therefore, the integral in right-hand side, Eq. (A3.6), may be expanded in wireline-like Taylor series with respect to the frequency:

$$\int_S \{\vec{H}_0^{M\alpha} \vec{h}\} dS \approx \qquad (A3.7)$$
$$b_0 + (-i\omega\mu)b_1 + (-i\omega\mu)^{3/2} b_{3/2} + (-i\omega\mu)^2 b_2 + \ldots$$

In axially symmetric models, coefficients $b_j$ have the following properties:

$b_0$ does not depend on formation parameters. It is related to so called 'direct field';

$b_1$ is linear with respect to formation conductivity. It is related to Doll's approximation;

$b_{3/2}$ depends only on background conductivity and does not depend on near borehole parameters;

$b_2$ includes dependence on borehole and invasion.

Let us substitute Eq. (A3.7) into Eq. (A3.6):

$$^{(1)}H_\alpha = \frac{1}{\sqrt{\sigma_c}} \left( \frac{b_0}{(-i\omega\mu)^{1/2}} + (-i\omega\mu)^{1/2} b_1 + (-i\omega\mu) b_{3/2} + (-i\omega\mu)^{3/2} b_2 + \ldots \right) \quad (A3.8)$$

Eq. (A3.3), (A3.4), and (A3.8) yield:

$$(-i\omega\mu)^{3/2}(H_\alpha)_{3/2} \approx (-i\omega\mu)^{3/2}(H_\alpha^0)_{3/2} + \frac{(-i\omega\mu)^{3/2} b_2}{\sqrt{\sigma_c}} \quad (A3.10)$$

Collecting traditionally measured in MFF terms $\sim \omega^{3/2}$, we obtain:

$$H_\alpha \approx H_\alpha^0 + \frac{1}{\sqrt{\sigma_c}} \left( \frac{b_0}{(-i\omega\mu)^{1/2}} + (-i\omega\mu)^{1/2} b_1 + (-i\omega\mu) b_{3/2} + (-i\omega\mu)^{3/2} b_2 + \ldots \right) \quad (A3.9)$$

The first term in the right hand side, Eq. (A3.10), depends only on background formation. The presence of imperfectly conducting mandrel makes the MFF measurement dependent also on a near borehole zone parameters (second term, coefficient $b_2$) and mandrel conductivity, $\sigma_c$. This dependence, obviously, disappears for a perfect conductor ($\sigma_c \to \infty$). We should expect a small contribution from the second term since conductivity $\sigma_c$ is very large.

To measure the term $\sim \omega^{3/2}$, we can modify MFF transformation in such a way that contributions proportional to $1/(-i\omega\mu)^{1/2}$ and $(-i\omega\mu)^{1/2}$, Eq. (A3.9), are cancelled. We also can achieve the goal by compensating the term $\sim 1/(-i\omega\mu)^{1/2}$ in the air and applying MFF to the residual signal. The latter approach id preferable because it improves the MFF stability (less number of terms needs to be compensated). Let us consider a combination of compensation in the air and MFF in more detail. It follows from Eq. (A3.9) that the response in the air, $H_\alpha(\sigma=0)$, may be expressed in the following form:

$$H_\alpha(\sigma=0) \approx H_\alpha^0(\sigma=0) + \frac{1}{\sqrt{\sigma_c}} \left( \frac{b_0}{(-i\omega\mu)^{1/2}} \right) \quad (A3.11)$$

Compensation of the term $\sim b_0$, Eq. (A3.11), is critical. Physically, this term is due to strong currents on the conductor surface and its contribution (not relating to formation parameters) may be very significant. Equations (A3.9) and (A3.11) yield the following compensation scheme:

$$H_\alpha - H_\alpha(\sigma=0) \approx (-i\omega\mu)(H_\alpha)_1 + (-i\omega\mu)^{3/2}(H_\alpha)_{3/2} + \frac{1}{\sqrt{\sigma_c}} \left( (-i\omega\mu)^{1/2} b_1 + (-i\omega\mu) b_{3/2} + (-i\omega\mu)^{3/2} b_2 + \ldots \right) \quad (A3.12)$$

Considering measurement of imaginary component of the magnetic field, we obtain:

$$\operatorname{Im}[H_\alpha - H_\alpha(\sigma=0)] \approx \\ -\left\{ \frac{1}{\sqrt{\sigma_c}} \left( \frac{\omega\mu}{\sqrt{2}} \right)^{1/2} b_1 + \omega\mu(H_\alpha)_1 + \left( \frac{\omega\mu}{\sqrt{2}} \right)^{3/2} \left( (H_\alpha)_{3/2} + \frac{b_2}{\sqrt{\sigma_c}} \right) \right\} \quad (A3.13)$$

Equation (A3.13) indicates that in MWD applications, two frequency terms must be cancelled as opposed to only one term in wireline. Equation, (A1.4), modified for MWD applications has the following form:

$$\begin{pmatrix} H(\omega_1) \\ H(\omega_2) \\ \vdots \\ H(\omega_{m-1}) \\ H(\omega_m) \end{pmatrix} = \begin{pmatrix} \omega_1^{1/2} & \omega_1^1 & \omega_1^{3/2} & \omega_1^{5/2} & \cdots & \omega_1^{n/2} \\ \omega_2^{1/2} & \omega_2^1 & \omega_2^{3/2} & \omega_2^{5/2} & \cdots & \omega_2^{n/2} \\ \vdots & \vdots & \vdots & \vdots & \cdots & \vdots \\ \omega_{m-1}^{1/2} & \omega_{m-1}^1 & \omega_{m-1}^{3/2} & \omega_{m-1}^{5/2} & \cdots & \omega_{m-1}^{n/2} \\ \omega_m^{1/2} & \omega_m^1 & \omega_m^{3/2} & \omega_m^{5/2} & \cdots & \omega_m^{n/2} \end{pmatrix} \begin{pmatrix} s_{1/2} \\ s_1 \\ s_{3/2} \\ s_{5/2} \\ \vdots \\ s_{n/2} \end{pmatrix} \quad (A3.14)$$

The residual signal (third term) depends on the mandrel conductivity but the examples considered in the report illustrate that this dependence is negligible due to very large conductivity of the mandrel. Similar approaches may be considered for the voltage measurements.

What is claimed is:

1. A method of determining a parameter of interest of an earth formation using an induction tool conveyed within a borehole in the earth formation, the induction tool having a mandrel (housing) with a finite, non-zero conductivity, said method comprising:

(a) using a transmitter and at least one axially-separated receiver for obtaining signals indicative of said parameter of interest said transmitter operating at a plurality of frequencies; and (b) processing said signals and determining the parameter of interest, said determination including:
      (A) applying a correction for said finite conductivity and
      (B) applying a multifrequency focusing.

2. The method of claim 1, wherein said parameter of interest further comprises a conductivity of said earth formation.

3. The method of claim 1, wherein processing said signals further comprises obtaining coefficients of an expansion of the magnetic field surrounding a mandrel having a finite non-zero conductivity.

4. The method of claim 3, wherein said expansion of the magnetic field further comprises a Taylor expansion of frequency including $\omega^{1/2}$.

5. The method of claim 1, the results of said multi-frequency focusing of said signals being independent of a separation between said at least one receiver and said transmitter.

6. The method of claim 1, wherein determining the parameter of interest further comprises:

(i) determining a magnitude of said signal at each one of said plurality of frequencies;

(ii) determining a relationship of said magnitudes with respect to frequency; and (iii) calculating a skin effect corrected conductivity by calculating a value of said relationship which would obtain when said frequency is equal to zero.

7. The method as defined in claim 6, wherein said determining said relationship includes calculating a best fit curve of the said magnitudes with respect to said frequency, calculating a first derivative of said best fit curve with respect to said frequency, and calculating a correction for said voltage magnitude at a selected frequency according to a relationship of said first derivative with respect to said frequency.

8. An apparatus for obtaining a resistivity parameter of an earth formation, said apparatus comprising:
   a) a mandrel (housing) on a measurement—while-drilling (MWD) tool having a finite, non-zero conductivity;
   b) a transmitter and at least one receiver spaced apart from said transmitter on said MWD tool, said transmitter operable at a plurality of frequencies for obtaining data indicative of said resistivity parameter; and
   c) a processor for determining said resistivity parameter from said obtained data, said determination including:
      (A) correcting for a finite non-zero conductivity of said mandrel and
      (B) application of multifrequency focusing (MFF).

9. The apparatus of claim 8, wherein said resistivity parameter further comprises an apparent conductivity of a formation layer proximate to said borehole.

10. The apparatus of claim 8, wherein said determination is independent of a spacing of said at least one receiver from said transmitter.

11. The apparatus of claim 8, wherein said processor performs a Taylor Series expansion in terms of frequency of said obtained data said expansion including a term in $\omega^{1/2}$.

12. The method of claim 1 wherein said at least one receiver comprises a plurality of receivers.

* * * * *